Patented Sept. 26, 1944

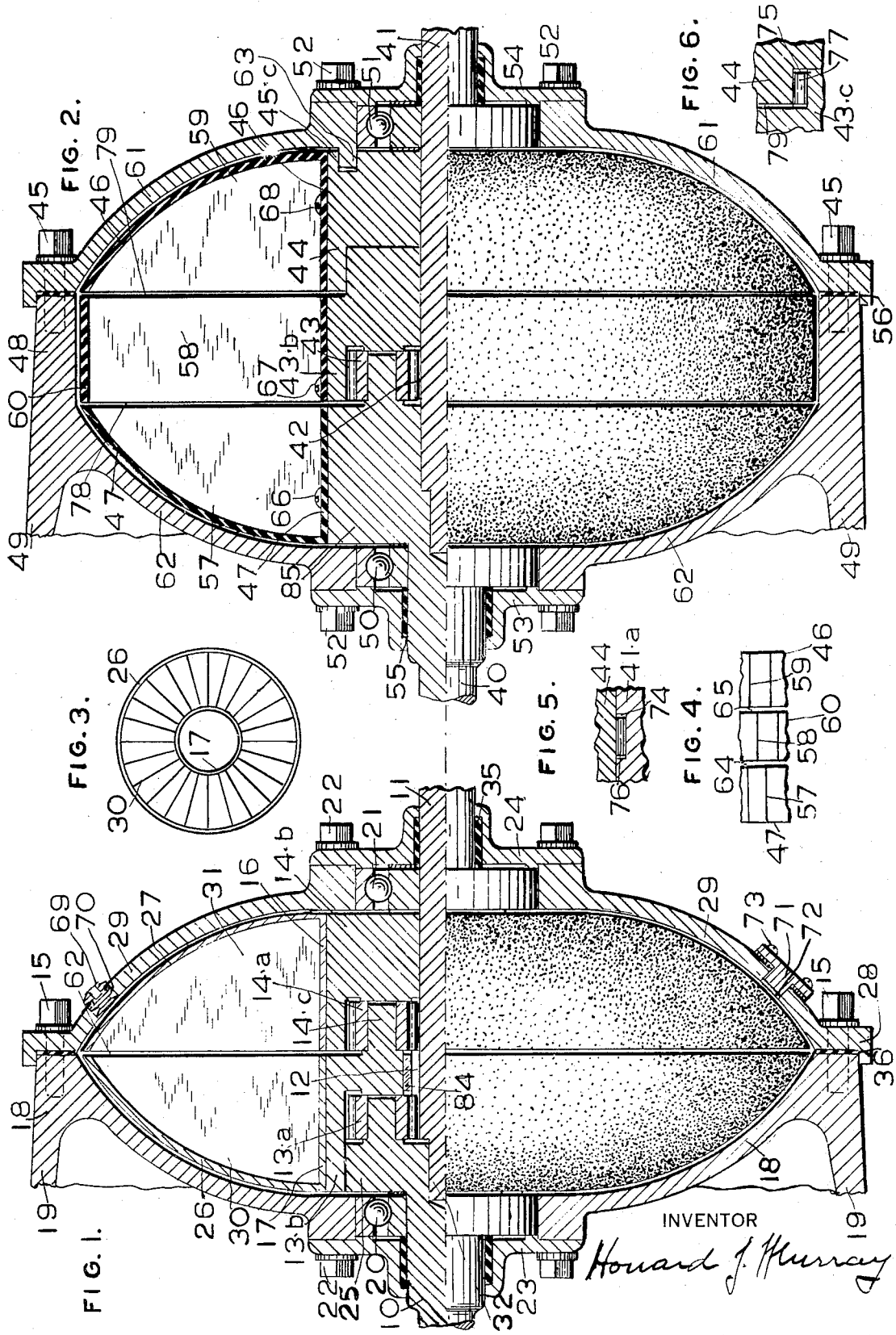

2,358,821

UNITED STATES PATENT OFFICE 2,358,821

FLUID DRIVE MECHANISM

Howard J. Murray, New York, N. Y.

Application September 24, 1940, Serial No. 358,062

10 Claims. (Cl. 74—189.5)

The present invention relates in general to an automatic fluid drive power transmission mechanism, and specifically relates to a device for automatically effecting universal drive relations between driving and driven members of a power transmission.

One of the objects of the present invention is to provide a simple form of fluid drive mechanism arranged so as to derive torque converting power from the driving member through planetary gearing and thence employ the said derived power so as to control the said gearing and thereby affect the driving relation of the said members.

A further object of the present invention is to employ a plurality of fluid associated drive control means in a torque responsive manner so as to bidirectionally effect the transmission of power from a driving member to a driven member.

A still further object of the present invention is to provide a combination of fluid drive control elements which will automatically become operative according to the directional load torque on the driven member.

A still additional object of the present invention is to provide a plurality of fluid drive elements arranged so as to automatically become torque responsive in a selective manner in accordance with the load torque on the driven member.

The present invention is a further development of the disclosure included in my U. S. Patent No. 2,143,709 issued Jan. 10, 1939, entitled Variable speed power transmission device.

While the present invention is obviously capable of use in any location wherein it is desired to transmit power from one power member to another, the present invention is particularly applicable to a power transmission device for use in connection with automotive vehicle construction, and it is in this connection that embodiments of the present invention will be described in detail.

Accordingly the present disclosure includes a plurality of fluid drive elements for effecting drive relations between power members during periods of different torque loads on the driven member without mechanical friction or shocks.

In one embodiment of the present disclosure a plurality of fluid drive elements are arranged so as to automatically become drive related by means of a fluid medium thereby to effect drive relations between drive and driven members according to the bidirectional load torque on one of the said members.

In the drawing:

Figure 1 is an embodiment of the present invention partly in vertical section taken axially of the main shaft.

Figure 2 is another embodiment of the present invention partly in vertical section taken axially of the main shaft.

Figure 3 is a diagrammatic presentation of one of the fluid drive elements showing an end view of the open side.

Figure 4 is a sectional plan view of the fluid drive elements of Figure 2 showing the operative relation of the fluid fins.

Figure 5 is a partial sectional elevation of a modification of the means of Figure 2 showing a roller clutch arrangement between one of the members and one of the fluid elements.

Figure 6 is a partial sectional elevation of a modification of the means of Figure 2 showing a roller clutch arrangement between two of the fluid drive elements.

While the parts employed in this disclosure will be identified by specific names for convenience of expression, they are intended to be as generic in their application to similar parts as common usage will permit.

There is shown by means of Figure 1 of the drawing a novel fluid drive control organization and associated power transmission elements collectively constituting a fluid power transmitting mechanism and including a pair of power shafts 10 and 11 disposed in axial alignment with their adjacent ends including the reduced portion 32 of the shaft 11 interfitted to provide proper bearing surface.

The power shafts 10 and 11 are mounted for independent rotary movement respectively in suitable bearings 20 and 21 supported in the casings 18 and 29. While either of these power shafts 10 and 11 may be considered as the normal driving member of the mechanism, for the purpose of this description, it will be considered that the shaft 10 is the normal driving member, and is operatively connected so as to be driven from a source of power (not shown) such as an internal combustion engine.

Accordingly shafts 10 and 11 are normally drive related so that the shaft 11 is the driven member, and is operatively connected to whatever mechanism (not shown) it is desired to drive.

The shaft 11 is preferably made of a good quality of steel and formed with sun teeth or splines 12 to operatively receive a plurality of groups of planet gears such as 13—a and 14—a constantly in drive relation with a plurality of annular gears such as 13—b and 14—b. The planet gear 13—a is carried by the normally driving member 10 and the planet gear 14—a is carried on the bearing portion 14—c of the member 13—b. One method of arranging the planet gears and the annular gears is shown by Figure 4 of my U. S. Patent No. 2,143,710 issued Jan. 10, 1939. The relative motions of the elements of the planetary gearing may be seen by reference to Fig. 7 of the drawing of my U. S. Patent 2,150,983 issued March 21, 1939. As the relative motions of the sun, planet and annular gears are described in the specification of this Patent No. 2,150,983, it is not believed necessary to repeat this teaching in the present disclosure.

With this arrangement, it is evident that each planet gear as 13—a and 14—a is constantly in mesh with portions of the sun teeth 12 and the teeth of one of the annular gears 13—b and 14—b. Power may be transmitted by and between the power members 10 and 11 through a plurality of power transmitting paths including the said planet and annular gears, and each of these paths will act as a positive means to transmit power in some relation to the degree of the retardation of the said annular gears 13—b and 14—b individually and collectively. The annular gear 13—b is supported by a conventional bronze bearing 84 splined to fit the teeth 12 of member 11. The gear 13—b in this embodiment is also shown as partially supported by the portion 25 of the normally driving member 10. The member 14—b is rotatably supported on the normally driven shaft 11.

A plurality of fluid drive elements 26 and 27 are mounted on the annular gears 13—b and 14—b of Figure 1 for rotation therewith. Thus fluid element 26 is mounted on the annular gear 13—b, and the fluid element 27 including the tubular portion 16 is mounted on the annular gear 14—b. The segmental fluid elements 26 and 27 may be rigidly attached to the said annular gears by a force fit, by bolts (not shown) or by any other conventional means. By means of Figure 3 there is shown a more or less diagrammatic view of the fluid element 26 of Figure 1. The element 26 (or 27) may be described as an oil cage with radially extending fins 30 attached to the hub portion 17 and the curved outside wall 26. The fins 30 may be flat or curved according to the manner of and the purpose for which the element 26 is installed and operated. The fluid element 27 is similar to the fluid element 26 and may be made of any suitable material such as a plastic or of steel sheets welded together. The elements may also be moulded or cast in one piece of such material as brass, bronze or aluminum. The elements 26 and 27 normally are axially spaced apart a distance indicated by the numeral 62.

In assembly, the fluid elements 26 and 27 are securely attached to the annular gears 13—b and 14—b. The annular gears, and the planet gears are assembled on the power members 10 and 11 as shown by Figure 1. The bearings 20 and 21 are placed in position and the casing portions 18 and 29 are bolted together by means of the bolts 15. The end member 23 is now bolted to the casing 18 by means of the bolts 22 with the fluid retaining material 35 in position. The casing portion 29 is formed with the portion 28 and 36 so as to insure alignment of the said casings. The end member 24 with its fluid retaining material is bolted to the casing 29. The enclosure formed by the casings, elements, gears and associated parts is now filed with the fluid to be used by means of the screw 69 in the threaded opening 70 and the cap 71 in the opening 72 secured to the casing 29 by means of the screws 73.

The casing portion 18 is formed with a bell extension portion 19 arranged (not shown) to be attached to the vehicle upon which the device is to be installed in a proper manner after the member 10 (or 11) has been connected to the source of power (not shown).

By means of Figure 2 there is shown a modification of the means of Figure 1 employing more than two fluid drive elements. In this embodiment three fluid drive elements 46, 47 and 60 are so arranged as to automatically become fluid associated in groups to act as a fluid drive control organization. The power members 40 and 41 are interfitted so as to be disposed in axial alignment. The members 40 and 41 are mounted for independent rotary movement respectively in suitable bearings 50 and 51 in turn positioned and supported by the casings 61 and 62.

While either of the members 40 and 41 may be considered as the driving member of the mechanism, for the purpose of this description, it will be considered that the member 40 is the normal driving member, and is operatively connected to be driven from a source of power (not shown) such as an internal combustion engine. The conventional clutch may be placed between the source of power and the member 40 if desired. It is contemplated by the present disclosure, that the member 40 (when employed as the driving member) may be directly connected to the source of power. Accordingly member 41 is regarded as the normally driven member, and is operatively connected to whatever mechanism (not shown) it is desired to drive.

The members 40 and 41 are preferably made of a good quality of steel, and the shaft 41 is formed with a plurality of splines or sun teeth 42 so as to operatively receive the planet teeth of a pluraltiy of planet gears 43 mounted on the portion 85 of the member 40 constantly in mesh drive relation with the annular teeth of the annular gear 43—b. The member 40 is formed with a radially extending portion 85 in bearing relation with the member 41. The planetary arrangement of the sun, planet and annular gears of Figure 2 is similar to the arrangement of either set of sun, planet and annular gears of Fig. 1.

The three fluid drive elements 46, 47 and 60 are preferably moulded or cast. The element 47 is securely attached to the member 40 by means of the screws 66. The element 60 is attached to the member 43—b by means of screws 67 so as to insure a clearance 78 between the fluid members 47 and 60, and the element 46 is attached to the member 44 by means of the screws 68 so as to insure a clearance space 79 between the fluid members 60 and 46.

The member 44 is normally loosely mounted on the member 41. The portion 45—c of the member 44 is formed with a recess to receive the projection 63 formed on the casing 61 so as to hold the member 44 and thereby the fluid element 46 against rotation as it is supported by the rotating memebr 41.

The means of the modification shown by Figure 2 are assembled in the same manner as for the means of Figure 1. All of the parts normally supported on the members 40 and 41 are assembled on same. The bearings 50 and 51 are placed in position and thence the assembly is moved into the casing 62 formed with the tubular portion 48. The end member 53 is secured to the casing 62 by means of the bolts 52 after the installation of the fluid retaining material 55. The end member 54 is secured to the casing 61 by means of the bolts 52. It should be noted that the fluid retaining material 55 may be of conventional form, and held in position by any of the many tried and accepted methods of employing packing material. Some of the fluid may be added at this time. The casing 61 is secured and aligned to the casing 62 by means of the portions 56 and the bolts 45 with the bearing 51 removed. More fluid may be added and the bearing 51 replaced and attached to the casing 61 by means of the bolts 52.

The member 40 is attached to the source of power as the bell portion 49 is attached to the vehicle by conventional means (not shown). The casing 61 may be provided with fluid holes similar to the fluid holes 70 and 72 of the casing 29 of Figure 1. Thus oil or fluid may be added after installation if desired.

In operation, let it be assumed that the source of motive power (not shown) is connected to the normal drive member 10 of Figure 1 by means of the conventional foot clutch (not shown) as commonly found on self-propelled vehicles, although it is possible according to the present disclosure to directly connect the member 10 to the said source of power.

Let it be further assumed for the purpose of this description, that the said source of power when connected to the member 10 will rotate the same clockwise as viewed from the left hand end of the means of Figure 1. The device to be driven, such as an automotive vehicle, is assumed to be connected to the normally driven member 11 through a conventional reversing unit (not shown) and the member 11 is normally driven in the same direction as the said member 10.

The transmission casing including the portions 18 and 29 is assumed to be well filled with a suitable fluid as hereinbefore stated. One of the novelties of the present disclosure is that of providing a fluid drive transmission mechanism in which the fluid drive medium may also be used to lubricate the transmission gearing as well as transmit power from one member to another.

With the normal drive member 10 rotating clockwise at constant speed (assumed for the purpose of this description) and without any load resistance on the normal driven member 11, all of the sun, planet and annular gears, the fluid drive elements 26 and 27 and associated fluid and the power members 10 and 11 will tend to rotate as a unit at the same clockwise speed about a common axis.

Now let it be assumed that a slight load torque is impressed on the member 11. The speed of the said member 11 will normally decrease slightly relative to the said constant clockwise speed of the normal driving member 10. A slight planetary reaction will occur between the sun, planet and annular gears of Figure 1 is described in Patent No. 2,150,983 issued March 21, 1939, see Figures 7 and 8. The planet gear 13—b of Figure 1 of the present disclosure and its attached fluid element 26 will accelerate to rotate faster than the normal driving member 10. The annular gear 14—b and its attached fluid element 27 will accelerate to rotate faster clockwise than the annular gear 13—b and the element 26. The fluid elements 26 and 27 are both rotating faster clockwise than the member 10, but at different speeds.

A fluid drive action will exist between the elements 26 and 27 according to the torque load impressed on the member 11. This drive action will tend to cause the members 10 and 11 to approach the same speed, and the power for causing this approach will be automatically derived from the driving member 10 according to the load on the member 11 and the design of the planetary gearing means of Figure 1.

The angular relation of the vanes 30 and 31 of the fluid elements 26 and 27 will also determine the fluid drive action, but for the purpose of this description, let it be assumed that the vanes are in planes passing through a common axis. If the torque load on the member 11 is now increased, the driving slip between the elements 26 and 27 will normally increase and the fluid drive action between the said elements will increase. Thus the fluid drive action between the fluid drive elements 26 and 27 is automatically torque responsive. Furthermore, the actual speed difference between the said elements 26 and 27 is not determined by the relative speeds of the members 10 and 11, but by the speed drive relation of the sun, planet and annular gears of Figure 1. The speed difference of the elements 26 and 27 may be very much less (or more) than the speed difference of the members 10 and 11.

This is true, because:

(a) The fluid drive action between the fluid drive elements may be varied by proper design without regard to the relative speeds of the power members 10 and 11.

(b) The fluid is primarily employed as a holding means.

If the impressed load torque on the normally driven member 11 is now decreased, the clockwise speed of the fluid elements 26 and 27 will correspondingly decrease. The clockwise speed of the element 27 will decrease faster than the clockwise speed of the fluid element 26.

When the normally driven member 11 becomes the driving member, and the conventional foot clutch is "out" all the movable elements of the means of Figure 1 will tend to rotate clockwise at the same speed about a common axis. Under these conditions there will be little or no appreciable load torque impressed on the now driven member 10.

When the said conventional foot-clutch is let "in," normally a load torque will be impressed on the member 10. A reaction will take place between the elements of the planetary gearing of Figure 1 in order to maintain the necessary differential drive relation between the sun, planet and annular teeth of Figure 1. Let it be assumed that when the said clutch is let "in," that the members 11 and 10 are initially rotating at the same speed. The impressed torque on the member 10 will tend to decrease its clockwise speed relative to the constant speed of the member 11.

The fluid elements 26 and 27 will be rotating clockwise as viewed from the left hand end of the means of Figure 1, but the clockwise speed of the annular gear 14—b and thus the element 27 will be less than the clockwise speed of the annular gear 13—b and thus the element 26. This action may be more clearly understood by referring to the description for similar relations of the annular gears described in my co-pending U. S. application Serial No. 353,441, filed August 21, 1940. As the speed of the now driven member 10 is still further decreased by increase of impressed load on the now driven member 10, the clockwise speeds of the annular gears 13—b and 14—b and the attached fluid elements 26 and 27 will continue to decrease.

With continued increase of impressed torque load on the driven member 10, the clockwise speeds of the fluid elements 26 and 27 will continue to decrease clockwise. As the clockwise speed of the element 27 is decreasing faster than the clockwise speed of the element 26, it is obvious that the speed of the element 27 will first reach zero and reverse to a counter-clockwise speed.

With continued increase of torque load on the driven member 10, the annular gear 13—b and thus the element 26 will also decrease to zero speed and thence reverse to rotate in a counter-clockwise direction. During this time the relative speeds of the members 10 and 11 have increased. Also the relative speeds of the fluid drive elements 26 and 27 have correspondingly increased. This speed relation of the said fluid drive elements 26 and 27 has changed in a torque responsive manner.

With a design of the parts of Figure 1 suitable for the manner of and the purpose for which the device will be installed and operated, the relative speeds of the said members 26 and 27 may be much less than the speeds of the members 10 and 11 (or, if desired, much greater).

One of the novelties of the present disclosure is that of providing a fluid drive organization with all the movable parts mounted for rotation about a common axis at any desired speed relative to the speeds of the drive and driven power members.

The means of Figure 1 may be regarded as a fluid clutch, or as a fluid variable speed power transmission device according to the manner of and the purpose for which it is installed and operated, because torque conversion may be obtained in the connecting force resolving action of the annular gears and the fluid drive control elements 26 and 27.

Thus, I provide a combination of means forming a plurality of power transmitting paths from a driving member to a driven member. One of these paths includes a fluid medium as a portion and the other paths are positive and mechanical.

In this respect the present disclosure may be considered as a development of the invention disclosed in my U. S. Patent No. 2,208,224, issued July 16, 1940, except that the fluid path as included in this 2,208,224 patent is employed to positively transmit power from one member to another during intervals of normal torque drive conditions.

It should also be noted at this time that the present disclosure is essentially a fluid equivalent of the electrical means disclosed in my U. S. Patent No. 2,170,460 issued August 22, 1939.

By means of Figure 2 there is shown a combination of means using more than two fluid drive elements. In this combination of means, the fluid drive element 47 is directly connected to the normal driving member 40 so that the fluid drive element 47 always rotates with the normal driving member 40. A plurality of screws 66 may be used to positively connect the member 40 and the element 47. The fluid drive element 60 is rigidly drive connected to the annular gear 43—b by means of the screws 67, and the fluid drive element 46 is connected to the member 44 by means of the screws 68. The element 46 is fixed against rotation in the modification shown by Fig. 2 because of the projection 63 formed on the casing 61 to project into the recess formed in the portion 45—c of the member 44.

In general, all of the modifications shown by Figures 2, and 4 to 6 inclusive provide means to rotate the fluid element 60 at the speed of either of the members 40 or 41, or to hold the element 60 at rest to cause universal drive relations between the members 40 and 41.

In the operation of the means of Figure 2, let it be assumed that the normal driving member 40 is rotating clockwise at constant speed as viewed from the left hand end of Figure 2. If there is no impressed load torque on the normally driven member 41 there will be no appreciable connecting force resolving action between the sun teeth 42, planet gear 43 and the annular gear 43—b. But the fluid element 46 is held against rotation, and the fluid elements 47 and 60 are tending to rotate at the same speed because of the slight torque on the driven member 41. But a fluid drive action exists between the fluid drive elements 60 and 46 which acts to retard the element 60 in its clockwise rotation. The fluid drive action of the fluid drive elements 46, 47 and 60 will be affected by the angular relation of the fluid fins 57, 58 and 59 (see Figure 4). The speed of the fluid element 47 will of course be that of the driving member 40. Element 46 is fixed against rotation in this particular operation. Thus the resulting speed of the element 60 with its fins arranged as shown by Figure 4 will be somewhere between the speed of the member 40 and zero speed. Thus the speed of the annular gear 43—b will be less than the speed of the member 40, and the speed of the driven member 41 will be greater clockwise than that of the member 40, or the member 41 will be driven overspeed. This is true, because the differential relations of planetary gearing will be maintained.

As the impressed torque load on the driven member 41 is increased, the connecting force resolving action between the sun, planet and annular gears will increase to eventually cause the fluid element 60 to rotate clockwise at the same speed as the driving member 40. Power will be positively transmitted through the planetary gearing under conditions of direct drive.

As the impressed torque on the driven member 41 is still further increased, the reactions between the planetary gears and the fluid drive elements will increase to cause the fluid element 60 to rotate clockwise faster than the driving member 40. In accordance with the necessary differential relations of the sun, planet and annular elements it is obvious that the driven member 41 will now rotate clockwise slower than the driving member 40. Power will now be transmitted at underspeed drive relations between the members 40 and 41.

As the impressed torque on the driven member 41 is now reduced, the reaction between the members of the planetary gearing of Figure 2 will be reduced, and the clockwise speed of the fluid element 60 will be reduced to eventually reach the speed of the driving member 40 and thence to be reduced to rotate clockwise at a smaller speed than the member 40 with the member 41 again rotating overspeed as at the start of the cycle for this operation.

Now assume that the member 41 becomes the driving member with a small initial torque impressed on the member 40. Let it be further assumed that the member 40 is initially rotating clockwise at the speed of the member 41 (altho it may be at rest). The reaction of the sun teeth 42 against the teeth of the planet gear 43 will rotate the annular gear 43—b relatively counter-clockwise to decrease its clockwise speed. The member 40 will decrease in speed relative to the member 41 in differential proportion to the extent that the annular gear 43—b is decreased in its clockwise speed.

With increase of torque load on the member 40, the fluid element 60 will decrease in its clockwise speed to approach the zero speed of the fluid element 46 which is tending to hold it at zero speed through the associated fluid medium. The fluid element 47 is tending to pull the fluid element 60 clockwise, and thus the medium will cause the fluid element 60 to assume a control speed somewhere between the speed of the member 47 and the zero speed of the member 46.

It should be noted that if the member 40 is at rest as the member 41 becomes the driving member, then the annular gear 43—b and the attached fluid element 60 and will be rotated counter-clockwise from zero speed against the fluid pull of the fixed fluid element 46. Such high relative speed between the fluid elements 60 and 46 will cause comparatively great reaction between the annular, planet and sun teeth of the planetary gearing and thus relatively great torque conversion between the members 40 and 41.

The counter-clockwise speed of the fluid element 60 with maximum torque impressed on the member 40 will also be a maximum, and a maximum fluid drive action will exist between the elements 60 and 47. There will also be relatively great difference of speed between the elements 47 and 60. These two fluid drive actions will add and increase as the elements 46, 47 and 60 cooperate in a torque responsive manner to increase the reactions of the planetary gearing to overcome the load resistance of the member 40.

As the load resistance of the member 40 is overcome, and it starts to rotate, the counter-clockwise speed of the fluid element 60 will decrease. As the speed of the member 40 increases, the force resolving torque converting action of the elements and the gearing normally will also decrease. If the member 41 is not able to overcome the load resistance of the member 40, with the force resolving action of the elements of Figure 2, then the member 40 cannot be driven with the design provided, and a new arrangement of the fluid element and gearing must be provided.

If the casing 61 of Figure 2 is removed and the casing 29 of Figure 1 installed in its place, the fluid element 46 will be formed to rotate freely on the member 41, because there is no holding projection 63 on the casing 29 of Figure 1. By means of this modification of the casing, the fluid drive relations of the said fluid drive elements 46, 47 and 60 will be considerably changed. The fluid element 60 may now be rotated in either direction without restraint from the fluid element 46.

The fluid element 46 and the member 44 are now freely mounted for rotation on the shaft 41. The element 46 may be considered as a fluid container or storage space, and the fluid action will be between the fluid drive control elements 47 and 60 with either of the members 40 or 41 driving. With the member 40 driving the fluid element 60 will be rotated clockwise faster than the element 47 as long as the member 41 is rotated slower than the member 40. With the member 41 driving under these conditions the element 60 will be rotated slower than the element 47 as long as the member 40 rotates slower than the member 41. Normally the element 46 will follow the element 60 with a small slip between same.

Now assume that the member 41 is removed from the combination of means shown by Figure 2 and the modified shaft 41—a of Figure 5 installed in its place. Shafts 41 and 41—a are identical, except shaft 41—a is formed with the cut away recess 74 to receive the roller clutches 76 of Figure 5 so that the said rollers 76 may become operatively drive associated with the member 44 to which the fluid element 46 is attached.

If the roller clutch arrangement of Figure 5 is provided so as to be unidirectional, the fluid element and the member 44 will be positively connected to the member 41 in one operative rotational direction and free from the said member 41 in the opposite rotational direction. According to this modification, the fluid element 46 will rotate with the member 41 (say) clockwise and not counter-clockwise.

With this automatic roller clutch arrangement selectively connecting the fluid element 46 to the power member 41, a unidirectional planetary fluid drive control action is produced by the fluid elements 46, 47 and 60. Relatively strong fluid drive actions will be obtained with this modification, because of the high relative speeds possible between the said fluid drive elements 46, 47 and 60. Very strong starting torque may be obtained. With the member 41 driving and little torque on the member 40, all the elements and the gear parts will rotate at approximately the same speed about a common axis. The same will be true when the member 40 is driving, if the roller clutch is properly set. It should be noted at this time that this modification provides a combination producing different drive relations when the member 40 is driving than when the member 41 is driving. For example, the roller clutches will automatically drive relate the members 41 and 44 when one of the members 40 and 41 is driving, and will not drive relate the members 41 and 44 when the other of the members 40 and 41 is the driving member.

Now assume that the shaft 41 of Figure 2 is replaced as shown and that the annular gear 43—b is replaced by the modified annular gear 43—c of Figure 6. The annular gear 43—c is identical to annular gear 43—b except that it is formed with cutaway portions 75 so as to operatively receive the clutch rollers 77 and to cause the rollers to become in unidirectional clutching relation with the member 44 of Figure 2. In this event the fluid drive control elements 60 and 46 will become mechanically fixed or clutched together in one rotational direction and mechanically free in the opposite rotational direction. This relation will depend on which is the driving and which is the driven. The unidirectional operation of the rollers 77 may be varied to meet the peculiar requirement under which the device is installed and operated.

Now if the casing 29 be removed and the casing 61 be replaced as shown on Figure 2, the roller clutch means of Figure 6 will cause the rollers 77 to move into clutching relation with the member 44 when the annular gear 43—c and thus the fluid element 60 tends to rotate clockwise when receiving power from the member 40. Thus the annular gear 43—c will be held at rest by the casing 61 and the member 41 will be rotated faster than the member 40 regardless of the fluid drive action of the elements 46, 47 and 60. Such action will be attractive in driving against engine compression. When the member 41 is driving under these roller clutch conditions the clutches 77 will not be moved into clutching position.

Figure 4 shows the angular relation of the fluid energizing vanes of the three fluid drive elements 46, 47 and 60 of Figure 2. These vanes or webs 57, 58 and 59 may all be parallel to each other and the common axis of the shaft 41 and spaced apart distances as indicated by the numerals 64 and 65, or they may be provided at various angles to the axis of the shaft and to each other according to the manner of and the purpose for which the device as so modified is installed and operated.

In conclusion, it will be understood that the present disclosure provides fluid drive control means for automatically effecting and affecting slip and non-slip drive relations at different speed-torque ratios between the driving and driven members. That both the fluid elements and the planetary gearing are arranged so as to individually and collectively derive a relatively small amount of control power from the driving member thereby to control the slip and non-slip transmission of a larger amount of power between the said driving and driven members.

That a fluid drive control means (see Figure 2) is provided by this disclosure whereby a plurality of fluid pressures are progressively and sequentially produced and employed in a kinetic manner to produce force and motion with varying mechanical advantages so as to cause one power member to drive another.

While I have shown and described and have pointed out in the annexed claims certain new and novel features of the present disclosure, it will be understood that certain well known equivalents of the elements illustrated may be used, and that various other substitutes, omissions and changes in the form and details of the devices illustrated and in their operation may be made by those skilled in the art without departing from the spirit of my invention.

Having thus described my invention, I claim:

1. In a device of the class described, the combination of cascaded planetary gearing, a driving rotor and a driven rotor normally in differential drive relation about a common axis, a fluid drive couple and a fluid for same, said couple including two fluid drive elements each positively drive related to different cascade set constituting drive elements of the said gearing and fluid drive related to each other, and leak-proof means for supporting and positioning said elements, said rotors and said fluid.

2. In a device of the class described, the combination of drive and driven power members, axially cascaded differential speed drive means for maintaining a drive relation between the said members, a fluid drive control means including two fluid drive elements, said fluid drive elements each drive related to different sets of axially cascaded elements of the said speed drive means and fluid drive related to each other, and a common fluid medium for lubricating and driving the said elements.

3. In a device of the class described, the combination of cascaded planetary gearing, drive and driven rotors, means for supporting and positioning the said gearing in drive relation about a common axis, a fluid drive control means including two differential fluid drive control elements each mounted for relative rotation with different cascaded sets of elements of the gearing and with each other, and a fluid medium for fluid drive relating the said fluid drive elements and thereby the said rotors.

4. In a device of the class described, the combination of a pair of power members, drive means including sets of sun, planet and annular gears for normally maintaining a slip-drive relation between the said power members, a fluid, and a fluid drive couple, said couple including fluid drive associated elements each mounted for positive drive relation with one of the said annular gears and in fluid drive relation with each other, said sun gears forming portions of one of the said members, one set of the said planet gears carried and positioned for revolution and rotation by the other power member, still another set of the said planet gears carried and positioned for revolution and rotation by one of the said fluid drive elements.

5. In a device of the class described, the combination of a pair of power members, cascaded speed drive means including sets of sun, planet and annular gears for normally maintaining a differential mechanical drive relation between the said members, a fluid, and a fluid drive control mechanism including a plurality of segmental fluid drive elements each mounted for rotation with a different cascaded annular gear of the said drive means, said sun gears constituting portions of one of the said power members, one set of planet gears mounted for rotation with and revolution on the other power member and in mesh with one of the planet gears and one of the sun gears, another set of planet gears mounted for rotation with and revolution one of the fluid drive elements and in mesh with another sun gear and another annular gear, said fluid and said fluid mechanism maintaining a fluid drive relation between said cascaded elements of the speed drive means thereby to control the said mechanical drive relation of the said members.

6. A device for causing torque conversion between a driving rotor, a driven rotor, a fluid medium, a fluid drive couple and cascaded planetary gearing including sets of sun, planet and annular elements, which includes means for positioning and supporting an element of the couple on an annular element of the gearing means for causing the other said fluid drive element to rotate with another annular element on the driven rotor, means for drive relating one of the sets of planet gears to the driving rotor, and further means for positioning and supporting the said gearing and said rotors in drive relation about a common axis so that the couple elements will be drive connected to different cascades of the said gearing.

7. A variable speed power transmission mechanism, including a plurality of sun, planet and annular gears, a driving rotor and a driven rotor, a fluid and associated fluid drive couple, said sun gears forming portions of the said driven rotor, means for mounting one of the elements of the said fluid drive couple of rotation with one of the said annular gears and one of the sets of planet gears, means for mounting the other fluid drive element on another annular gear in turn loosely mounted on the said driven rotor, means for drive relating another sets of planet gears to the said driving rotor, and means for supporting and positioning said gears, rotors, couple and fluid in symmetrical torque converting drive relation about a common axis.

8. In a device of the class described, the combination of cascaded groups of speed gearing and drive and driven rotors drive related to the said gearing, a fluid and an associated fluid drive couple including driving and driven elements each mounted on a different rotatable element so as to be drive connected to different cascade groups of the gearing for rotation therewith thereby to drive relate the said rotors according to the torque load on one of the said rotors and also the difference in speed of the said shafts.

9. In a device of the class described, the combination of drive and driven rotors and cascaded planetary gearing including sets of sun, planet and annular gears in drive relation, a fluid, and a fluid drive couple, said couple including segmental fluid drive elements separately mounted on different annular elements of the gearing, one of the said sets of planet gears mounted for both rotation and revolution on the said drive rotor, another of the said sets of planet gears mounted for both revolution and rotation on one of the said fluid couple elements, said sun gears forming portions of the said driven rotor and in constant drive relation with the said sets of planet gears, and means for operatively submerging the said couple elements in the said fluid so as to be in differential fluid and/or positive drive relation with each other and with different cascaded elements of the said gearing and therethrough the said rotors.

10. In a device of the class described, the combination of sun, planet, annular, drive and driven power elements in drive relation, a fluid and an associated fluid drive couple including two fluid drive elements, each couple element positively drive related to one of the said annular gears and fluid drive related to the other fluid element, said sun gears mounted for rotation with the drive element and in drive relation with the said planet elements, certain of the said planet gears mounted for rotation with and for revolution on the said driven element, certain other of the said planet gears mounted for both revolution and rotation on one of the said couple elements.

HOWARD J. MURRAY.